United States Patent
Hamana

(10) Patent No.: US 6,321,526 B1
(45) Date of Patent: Nov. 27, 2001

(54) GAS TURBINE STARTING CONTROL SYSTEM

(75) Inventor: Hiroyuki Hamana, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/252,454

(22) Filed: Feb. 18, 1999

(30) Foreign Application Priority Data

Feb. 19, 1998 (JP) .................................................. 10-037278

(51) Int. Cl.$^7$ .................................. F02G 3/00; F02C 7/26
(52) U.S. Cl. ...................... 60/39.05; 60/39.141; 60/39.55
(58) Field of Search ............................. 60/39.141, 39.55, 60/39.05

(56) References Cited

U.S. PATENT DOCUMENTS

| | | | |
|---|---|---|---|
| 4,350,008 | * 9/1982 | Zickwolf, Jr. | 60/39.141 |
| 5,101,619 | * 4/1992 | Morris et al. | 60/39.141 X |
| 5,121,596 | * 6/1992 | Takehara et al. | 60/39.141 X |
| 5,241,817 | * 9/1993 | George, Jr. | 60/39.182 |
| 5,315,816 | * 5/1994 | Kemmer et al. | 60/39.02 |

FOREIGN PATENT DOCUMENTS 10-8999    1/1998 (JP) .

* cited by examiner

Primary Examiner—Charles G. Freay
(74) Attorney, Agent, or Firm—Sughrue, Mion, Zinn, Macpeak & Seas, PLLC

(57) ABSTRACT

A gas turbine starting control system is provided, wherein starting power is increased while an inlet gas temperature of the turbine is prevented from rising during starting of the gas turbine, so that a starting motor can be reduced in size and the system cost can also be reduced. Accordingly, a gas turbine starting control system for a gas turbine in which starting power is supplied to a rotational shaft of a compressor and a turbine by using a starting motor in order to start the compressor and the turbine, comprises: a steam pipe for supplying steam to a combustor in the gas turbine; a temperature detector for detecting an inlet gas temperature of the turbine; a steam control valve provided at the steam pipe for opening and closing the steam pipe; and a valve controlling unit for controlling the opening degree of the steam control valve in response to detection signals of the inlet gas temperature from the temperature detector.

3 Claims, 3 Drawing Sheets

GAS TURBINE STARTING CONTROL SYSTEM

BACKGROUND OF THE INVENTION

1. Field of the Invention

The present invention relates to a gas turbine, and in particular, to a gas turbine starting control system capable of increasing starting power while suppressing a rise in inlet gas temperature of the turbine during starting of the gas turbine.

2. Description of the Related Art

FIG. 3 is a block diagram schematically showing a general gas turbine. In FIG. 3, reference numeral 1 indicates a compressor for compressing intake gas (air) 2, reference numeral 5 indicates a turbine coaxially provided with the compressor 1, and reference numeral 4 indicates a combustor. High-pressure air compressed by the compressor 1 is first delivered through a compressed-air path 13 to the combustor 4 where fuel is injected into the high-pressure air for combustion. As a result, combustion gas is generated. This combustion gas is then delivered to the turbine 5 through a combustion gas path 12 to perform expansion work by acting on moving blades of the turbine.

The gas turbine with the above mentioned arrangement generally exhausts some of the intake gas 2 (air) sucked into the compressor 1 to the outside through an extraction pipe 3 during starting of the gas turbine to prevent a rotating stall of the compressor 1. Accordingly, since the gas supplied to the turbine 5 through the combustor 4 has a smaller flow rate during starting of the gas turbine, there is a need for auxiliary power to start rotation of the rotational shaft of the compressor 1 and turbine 5. Consequently, a starting motor 6 is connected to the rotational shaft of the compressor 1 and turbine 5, and the power of the starting motor 6 is supplied thereto as an auxiliary power for starting the gas turbine.

FIG. 2 illustrates changes in an inlet gas temperature of the turbine with respect to the number of revolutions during starting of the above mentioned gas turbine provided with a starting motor. In the conventional gas turbine, as indicated by line B in FIG. 2, the inlet gas temperature of the turbine reaches it's maximum point at about 50% of rated speed and may exceed a predetermined allowable value. Moreover, line A in FIG. 2 indicates changes in the inlet gas temperature of the turbine with respect to the number of revolutions during starting of a gas turbine in accordance with the present invention, to be described later.

Nevertheless, in conventional gas turbines sufficient cooling air is generally not supplied to the moving blades and the like during starting of the gas turbine. Accordingly, the inlet gas temperature of the turbine must be kept at the above-mentioned allowable value (see FIG. 2) or lower. Consequently, in the conventional gas turbines described above, the starting motor 6 must have a large capacity in order to prevent an excess turbine load at the above-described 50% of rated speed. Accordingly, there are problems in that the space required to install such a large, high capacity starting motor is increased which increases the cost of the system as well.

SUMMARY OF THE INVENTION

The present invention has been made to provide a gas turbine starting control system, wherein the starting power is enhanced while the inlet gas temperature of the turbine is restrained from rising during starting of the gas turbine, so that the starting motor can be reduced in size and the system costs can be reduced.

The present invention is intended to solve the foregoing problems and to provide a gas turbine starting control system for a gas turbine in which starting power is supplied to a rotational shaft of a compressor and turbine by using a starting motor in order to start the compressor and the turbine. The gas turbine starting control system comprises a steam pipe for supplying steam to a combustor in the gas turbine; a temperature detector for detecting an inlet gas temperature of the turbine; a steam control valve provided at the steam pipe for opening and closing the steam pipe; and a valve controlling unit for controlling the opening degree of the steam control valve in response to detection signals of the inlet gas temperature from the temperature detector.

In accordance with the above-mentioned structure, the valve controlling unit outputs a release signal to the steam control valve when the inlet gas temperature detected by the temperature detector is above a predetermined allowable value. The steam control valve then opens the steam pipe leading to the combustor in response to the release signals. Thus, steam having a predetermined pressure is delivered to the combustor and then supplied to the turbine together with the gas delivered from the combustor.

With such an arrangement, the turbine can obtain an output increase corresponding to the energy of the steam delivered to the combustor during starting while the inlet gas temperature of the turbine can be kept at a predetermined allowable value or lower. Therefore, according to the present invention, the inlet gas temperature of the turbine can be maintained at a predetermined allowable value or lower, and the gas turbine can be safely started up with a large starting power supplemented by the energy of the steam.

BRIEF DESCRIPTION OF THE DRAWINGS

In the accompanying drawings.

DESCRIPTION OF THE PREFERRED EMBODIMENTS

Figure 1:
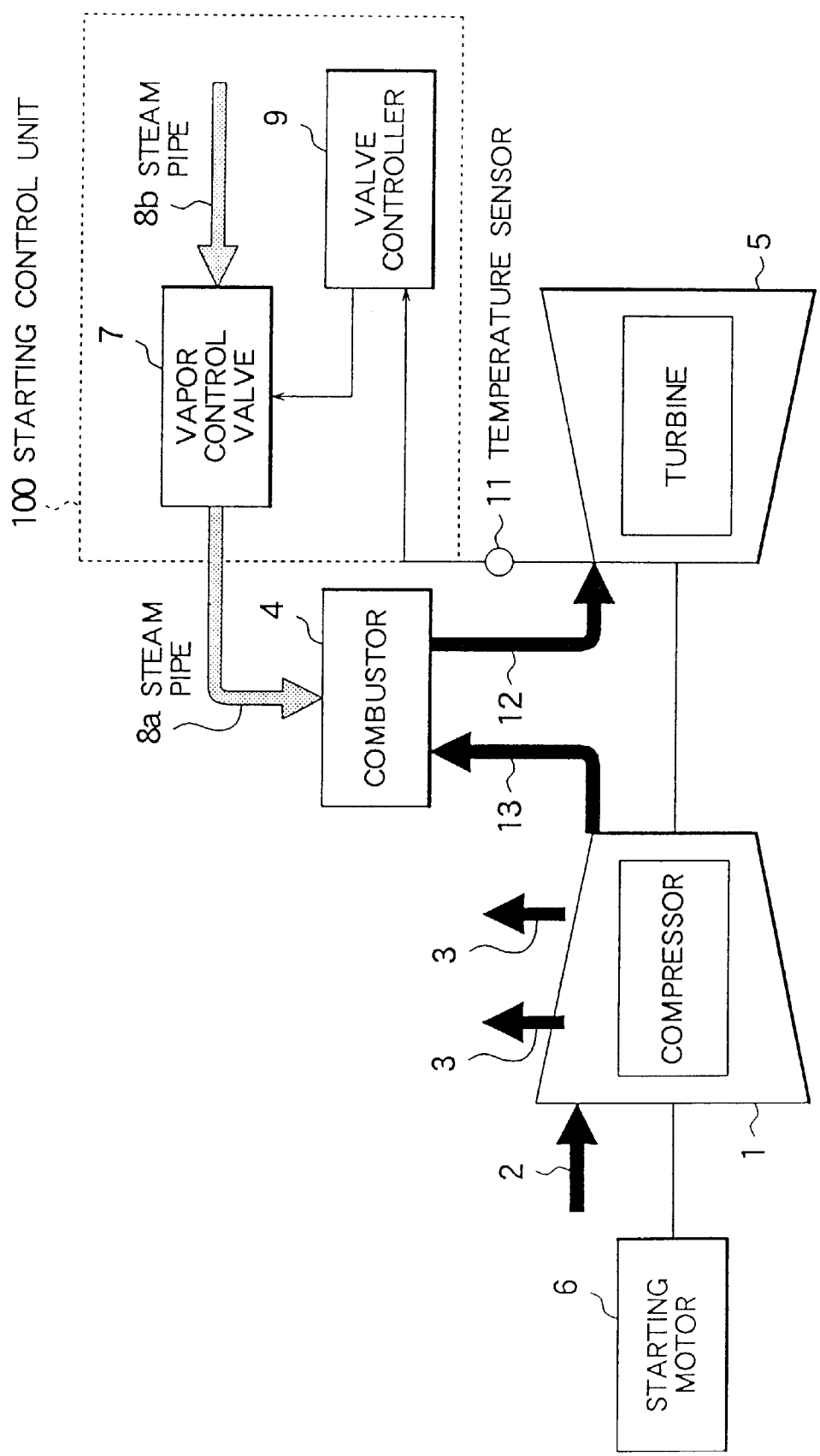
FIG. 1 is a block diagram schematically showing a gas turbine starting control system in accordance with an embodiment of the present invention.
Figure 2:
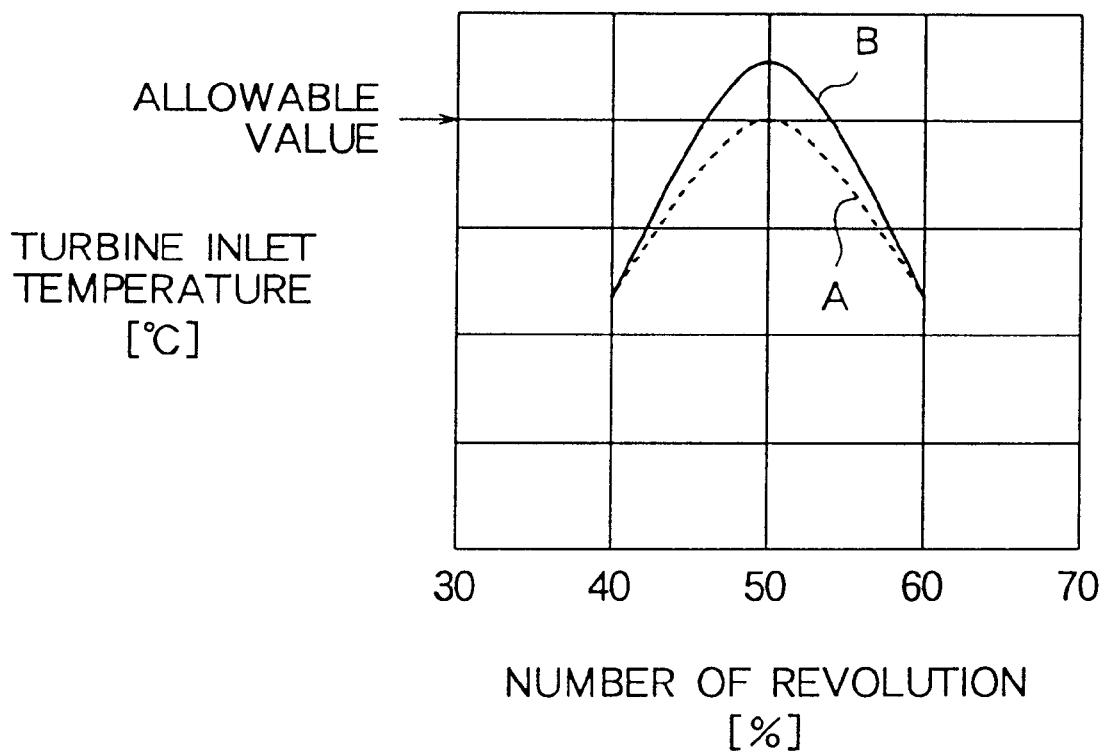
FIG. 2 is a graph showing an inlet gas temperature of the turbine during starting of the gas turbine.

Hereinafter, a description will be made of a preferred embodiment of the present invention with reference to FIGS. 1 and 2. FIG. 1 is a block diagram showing a gas turbine starting control system in accordance with the present invention, and FIG. 2 is a graph showing turbine inlet gas temperature.

Referring now to FIG. 1, reference numeral 1 indicates a compressor for compressing intake gas (air) 2, reference numeral 5 indicates a turbine coaxially provided with the compressor 1, and reference numeral 4 indicates a combustor. High-pressure air compressed by the compressor 1 is first delivered through a compressed-air path 13 to the combustor 4, where fuel is injected into the high-pressure air for combustion. As a result, a combustion gas is generated. This combustion gas is then delivered to the turbine 5 through a combustion gas path 12 to perform expansion work by acting on the moving blades of the turbine.

Figure 3:
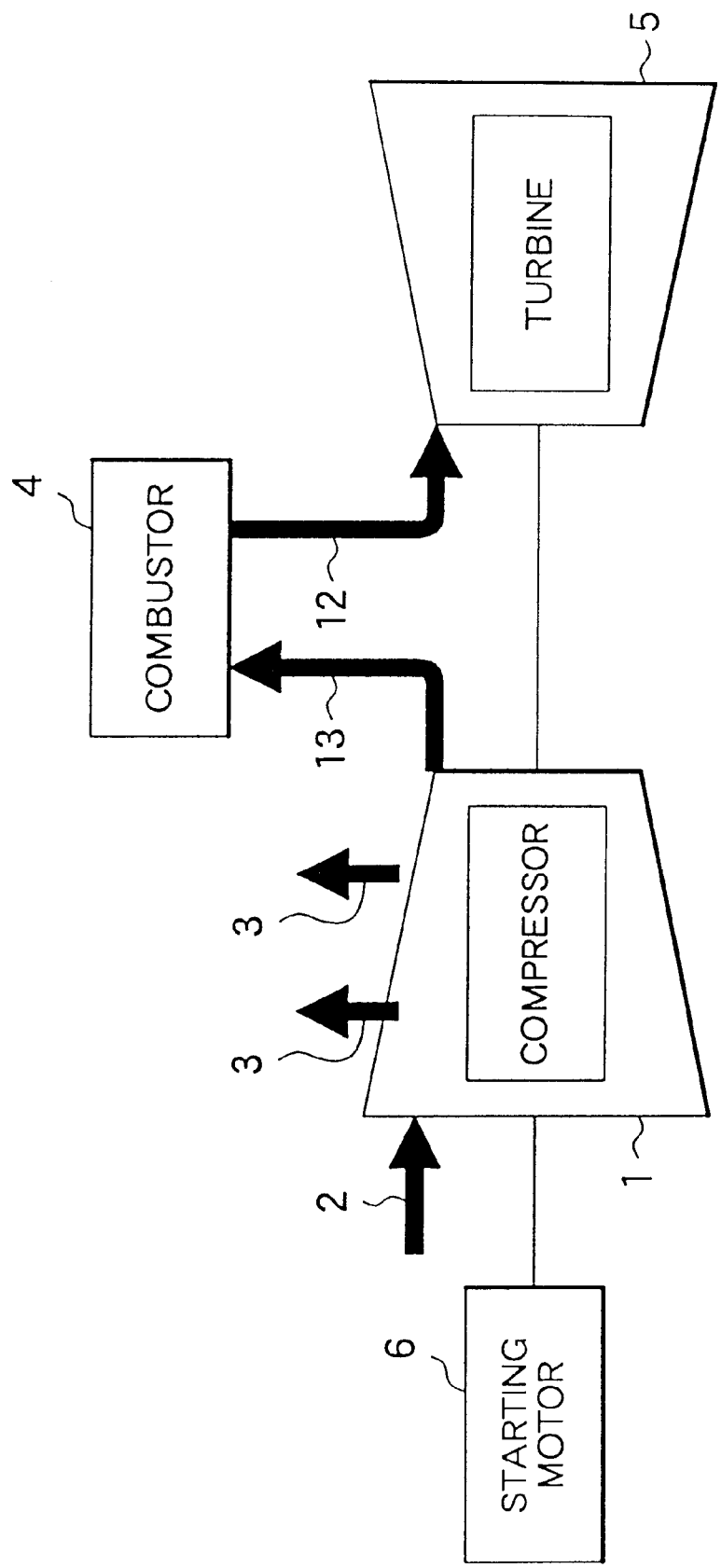
FIG. 3 is a view showing a conventional example corresponding to FIG. 1.

Reference numeral 3 denotes an extraction pipe for extracting some of the intake gas 2 outside of the compressor 1 so as to prevent rotating stall in the compressor 1 during starting of the gas turbine. Reference numeral 6 denotes a starting motor directly connected to the rotational shaft of the compressor 1 for supplying rotational power to the compressor 1 and to the turbine 5 during starting. The foregoing arrangement is made in the same manner as in the conventional one shown in FIG. 3.

Next, an arrangement of the starting control system according to the present invention will be described in detail. Reference numeral 100 indicates a starting control system in accordance with the present invention, and is comprised of a steam control valve 7 and a valve controlling unit 9. Steam having a predetermined pressure is introduced into the steam control valve 7 from a steam source (not shown) through a steam pipe 8b. On the other hand, an outlet of the steam control valve 7 is connected to the combustor 4 via a steam pipe 8a.

Reference numeral 11 indicates a temperature sensor for detecting the inlet gas temperature of the gas turbine 5. Detection signals of the inlet gas temperature detected by the temperature sensor 11 are input to the valve controlling unit 9. Output signals of the valve controlling unit 9, i.e., valve controlling signals, are then transmitted to the steam control valve 7. The steam control valve 7 has an arrangement such that the valve opening degree thereof can be controlled by the valve controlling signals in the valve controlling unit 9.

A gas turbine provided with the starting control system having the above mentioned arrangement will now be described in terms of the operations thereof during starting of the gas turbine. When the starting motor 6 is driven, and the compressor 1 and the turbine 5 are subjected to rotation during starting of the gas turbine, the output of the gas turbine is increased and the turbine inlet gas temperature is also increased. The temperature sensor 11 detects this inlet gas temperature to allow the detection signals to be input to the valve controlling unit 9. The allowable value of the inlet gas temperature of the turbine is preset in the valve controlling unit 9. Therefore, when the inlet gas temperature detected by the temperature sensor 11 reaches the predetermined allowable value or above, the valve controlling unit 9 outputs a valve release signal to the steam control valve 7.

Upon receiving the valve release signals, the steam control valve 7 is released, and the steam pipes 8a, 8b are communicated with each other. This allows the steam having the predetermined pressure to be delivered to the combustor 4. The thus delivered steam is supplied to the turbine 5 together with the combustion gas delivered from the combustor 4 to act on the turbine. The turbine 5 can therefore obtain an output increase corresponding to the energy of the steam delivered thereto during starting of the gas turbine. Further, this steam does not cause the inlet gas temperature of the turbine to increase, and hence the inlet gas temperature of the turbine is still maintained at the above mentioned allowable inlet gas temperature or lower.

As illustrated in FIG. 2, a gas turbine is generally designed so that the inlet gas temperature of the turbine during starting reaches the maximum point at about 50% of the rated speed thereof. Accordingly, the gas turbine provided with the starting control system according to the present invention is designed such that at about 50% of the rated speed, the valve controlling unit 9 opens the steam control valve 7 in response to the detection signal of the inlet gas temperature of the turbine to supply the steam. As a result, as indicated by line A of FIG. 2, the inlet gas temperature of the turbine is maintained at the allowable value or lower, which is lower than that of the conventional turbine as indicated by line B.

According to the present invention having the above mentioned arrangement, the opening degree of the steam control valve provided at the steam pipe is controlled during starting of the gas turbine. Consequently, the starting energy can be increased corresponding to the energy of the steam supplied to the combustor through the steam pipe while maintaining the inlet gas temperature of the turbine at a predetermined allowable value.

Accordingly, the inlet gas temperature of the turbine can be maintained at a predetermined allowable value or lower. This enables the gas turbine to be safely started up with a larger starting energy to which the corresponding energy of the steam is added. Consequently, the starting motor can be reduced in size, thereby realizing the size reduction of the plant itself as well as a reduction of the system cost.

The preferred embodiment of the present invention and alternative embodiments have been described in detail with reference to the drawings. It should be noted that the present invention is not intended to be limited to these embodiments, but a variety of additional applications and modifications in the gas turbine starting control system may be readily contemplated and realized by persons having skill in the art, without departing from the spirit and scope of the appended claim.

What is claimed is:

1. A gas turbine starting control method for a gas turbine in which starting power is supplied to a rotational shaft of a compressor and turbine by using a starting motor in order to start the compressor and the turbine, comprising the steps of:

providing a starting control system comprising a steam pipe for supplying steam to a combustor in the gas turbine; a temperature detector for detecting an inlet gas temperature of the turbine; a steam control valve provided at the steam pipe for opening and closing the steam pipes; and a valve controlling unit for controlling the opening degree of the steam control valve in response to detection signals of the inlet gas temperature from the temperature detector;

delivering the starting motor to rotate the compressor and the turbine;

delivering high-pressure air compressed by the compressor to the combustor for gas by injecting fuel into the high-pressure air for combustion;

delivering the combustion gas from the combustor to the turbine to perform expansion work by acting on moving blades of the turbine;

outputting a release signal from the valve control unit to the steam control valve when the inlet gas temperature of the turbine detected by the temperature detector is above a predetermined allowable value during starting of the gas turbine.

2. A gas turbine starting control method for a gas turbine comprising the steps of:

driving a starting motor connected to a rotational shaft of the compressor and a turbine for supplying auxiliary power during starting to rotate the compressor and the turbine;

delivering high-pressure air compressed by the compressor to a combustor;

generating a combustion gas by injecting fuel into the compressed air from the compressor for combustion in the combustor;

delivering the combustion gas from the combustor to a turbine to perform expansion work on moving blades inside the turbine; and supplying steam having a predetermined pressure to the combustor by a starting control system when an inlet gas temperature of the turbine is above a predetermined allowable value.

3. A gas turbine starting control method for a gas turbine as set forth in claim 2, wherein the starting control system comprises a steam control valve for opening and closing a steam pipe that supplies steam to the combustor, and a valve controlling unit for controlling the valve opening degree of the steam control valve in response to the inlet gas temperature of the turbine.

* * * * *